United States Patent [19]

De Coi et al.

[11] Patent Number: 4,700,289

[45] Date of Patent: Oct. 13, 1987

[54] METHOD OF REGULATION AND REGULATING DEVICE FOR AN APPARATUS OR GROUP OF APPARATUSES, AS WELL AS AN APPARATUS HAVING A REGULATING DEVICE

[75] Inventors: Beat De Coi, Sargans; Hans-Peter Keller, Wagen, both of Switzerland

[73] Assignee: Gebrüder Loepfe AG, Wetzikon, Switzerland

[21] Appl. No.: 624,268

[22] Filed: Jun. 25, 1984

[30] Foreign Application Priority Data

Jul. 1, 1983 [CH] Switzerland .......................... 3630/83

[51] Int. Cl.$^4$ ............................................. G05B 17/00
[52] U.S. Cl. ..................................... 364/150; 318/561
[58] Field of Search ............... 364/148, 149, 150, 151, 364/152, 153, 154, 155, 156, 157, 478; 318/561, 568, 567

[56] References Cited

U.S. PATENT DOCUMENTS

| | | | |
|---|---|---|---|
| 3,655,954 | 4/1972 | Speth | 364/149 |
| 3,795,799 | 3/1974 | Courtiol | 364/150 |
| 3,920,965 | 11/1975 | Sohrwardy | 364/149 |
| 4,151,587 | 4/1979 | Bénéjean | 364/150 |
| 4,151,588 | 4/1979 | Hammer | 364/155 |
| 4,214,301 | 6/1980 | Kurihara et al. | 364/150 X |
| 4,479,176 | 10/1984 | Grimshaw | 364/152 X |
| 4,509,110 | 4/1985 | Levesque et al. | 364/150 |
| 4,519,040 | 5/1985 | Brankampt et al. | 364/153 |
| 4,527,231 | 7/1985 | Aucel et al. | 364/149 |
| 4,569,025 | 2/1986 | Eirich et al. | 364/154 |

*Primary Examiner*—Jerry Smith
*Assistant Examiner*—A. MacDonald
*Attorney, Agent, or Firm*—Werner W. Kleeman

[57] ABSTRACT

The method of regulation employs a simulation process for at least one state variable of an apparatus to be controlled and regulates the state variable. In the process, a curve of an operating characteristic having its base at an idle state value is traversed up to an operating state value. When re-regulating, the regulation process begins at the current value of the state variable. The value of the regulation variable corresponds to the idle state. This has the advantage of a defined initial point for re-regulation. A regulating device for performing the method of regulation comprises a series circuit containing an input circuit, a regulation circuit with a simulation device for regulating an apparatus as well as a control circuit for possible machines coupled to the apparatus. The simulating device is adjustable according to operating characteristics or apparatus parameters. Another regulating device fulfills the same function while employing a computer and correspondingly modified circuits.

12 Claims, 4 Drawing Figures

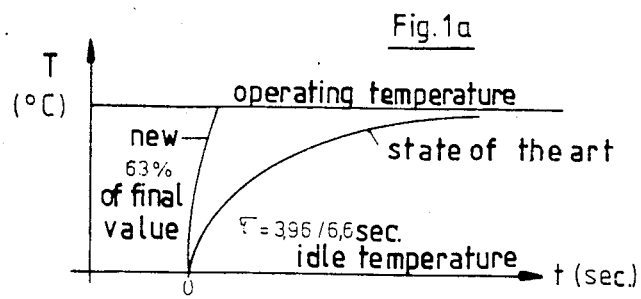
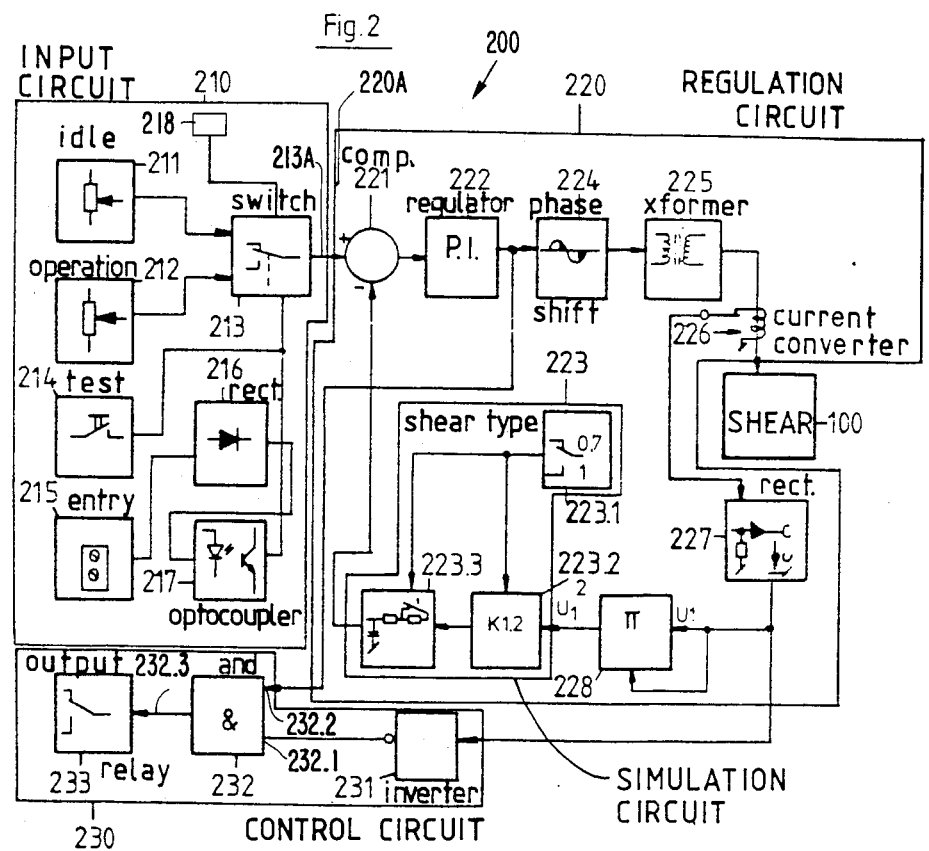

METHOD OF REGULATION AND REGULATING DEVICE FOR AN APPARATUS OR GROUP OF APPARATUSES, AS WELL AS AN APPARATUS HAVING A REGULATING DEVICE

BACKGROUND OF THE INVENTION

The present invention broadly relates to the regulation of apparatus and, more specifically, pertains to a new and improved method and device for regulating an apparatus or group of apparatuses and to an apparatus having a regulating device.

The apparatus to be regulated can, in particular be arranged to process fabric edges or selvedges and can, for instance, be an electrothermal shear.

Fabric edges or selvedges are in many cases and independently of the weaving process severed or cut off in weaving. The newly formed fabric edge must be bonded.

In woven fabrics which comprise synthetic fiber components, the fabric edges or selvedges are often severed by means of a thermal or heated shear which welds or fuses the newly formed fabric edges during the severing process. In fabrics without a substantial synthetic fiber content, special measures must be taken and special devices employed in order to bond the fabric edges.

However, an exact control of the operation of this processing device in relation to the materials employed in the woven fabric is required for both groups.

In heretofore known devices, especially in known thermal shears, this is not the case.

For example, one known thermal shear comprises a heated rod containing a potentiometer coupled to the rod which is pivotable in a joint or hinge and is journaled to swing or pivot in a direction extending substantially transverse to the plane of the fabric length. This known thermal shear is pressed against the initial or forward edge of a fabric length by means of a spring. In the nearly vertical idle position, the potentiometer feeds a current into the rod which prevents the rod from heating too strongly or from heating at all. As the rod is deflected by the traveling fabric length, the potentiometer feeds a current into the heated rod enabling the rod to sever the fabrics.

This thermal shear has the disadvantage that the heated rod continues to melt the fabric with its residual heat after the cloth of fabric length has ceased to move and the cutting or severing current has been switched off. Since the fabric length no longer moves, damage to the fabric occurs in the region of the idle position of the only slowly cooling rod.

Another electrothermal cutting apparatus is known from the German Pat. No. 3,140,560 and comprises a circuit arrangement for regulating the supply of current during the operating interval and during the idle interval. The circuit arrangement automatically sets a higher current supply at the beginning of the operating interval and switches it off again at the end of the operating interval. The circuit arrangement also comprises circuitry operating according to the phase shift control method and having adjustable delay circuits and a switching device actuated by the drive of the machine being regulated. The time constant of the first delay device depends upon the position of a closure contact controlled by the processing machine. Both delay circuits conjointly with a power control stage effect a phase shift control whose firing or triggering angle is determined by the two delay circuits.

The magnitude of the firing or triggering angle determines the onset and the duration of the current flow through the power control stage and through the cutting or severing device. The current flow or flux can be adapted to the type and thickness of the fabric to be severed as well as to the operating and idle intervals. A substantial disadvantage of this circuit arrangement is the very slow temperature rise at the shear or shears when switching from the idle interval to the operating interval. For rapidly operating machines this temperature rise occurs too slowly, which leads to fabric waste or scrap.

SUMMARY OF THE INVENTION

Therefore, with the foregoing in mind it is a primary object of the present invention to provide a new and improved method and device for regulating an apparatus as well as an apparatus regulated by the device and method which do not have associated with them the aforementioned drawbacks and shortcomings of the prior art constructions.

Another and more specific object of the present invention aims at providing a new and improved method and device for regulating an apparatus or group of apparatuses enabling the alternation between two values of at least one state or operating variable to be very rapidly effected. For instance, when switching from the idle or rest state to the operating state, the value alternation is to be effected very rapidly. In particular, such a regulation device is to be connected to an apparatus for cutting off or severing the fabric edges or selvedges from a fabric length.

Yet a further significant object of the present invention aims at providing a new and improved construction of a device of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the method of the present invention is manifested by the features that it comprises the steps of tapping or extracting at least one state or operating variable of the apparatus to be regulated from the apparatus to be regulated or from a control circuit of the apparatus to be regulated, conducting the tapped state or operating variable to a simulation circuit for simulating a variable of an operating characteristic of the apparatus to be regulated, and conducting the simulated value of the operating characteristic to a comparison and regulation circuit for regulating the apparatus.

The device of the present invention is manifested by the features that it contains an input circuit, a regulation circuit connected to the input circuit and a control circuit connected to the regulation circuit.

The apparatus of the present invention is manifested by the features that it comprises an apparatus for severing or cutting off selvedges of fabric lengths.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein:

FIG. 1a diagrammatically shows curves of operating characteristics of the operating temperature in a device according to the state of the art and according to the invention, respectively;

FIG. 2 is a schematic circuit diagram of a first embodiment of a regulating device according to the invention.

DETAILED DESCRIPTION OF THE PREFERRED EMBODIMENT

Figure 1B:
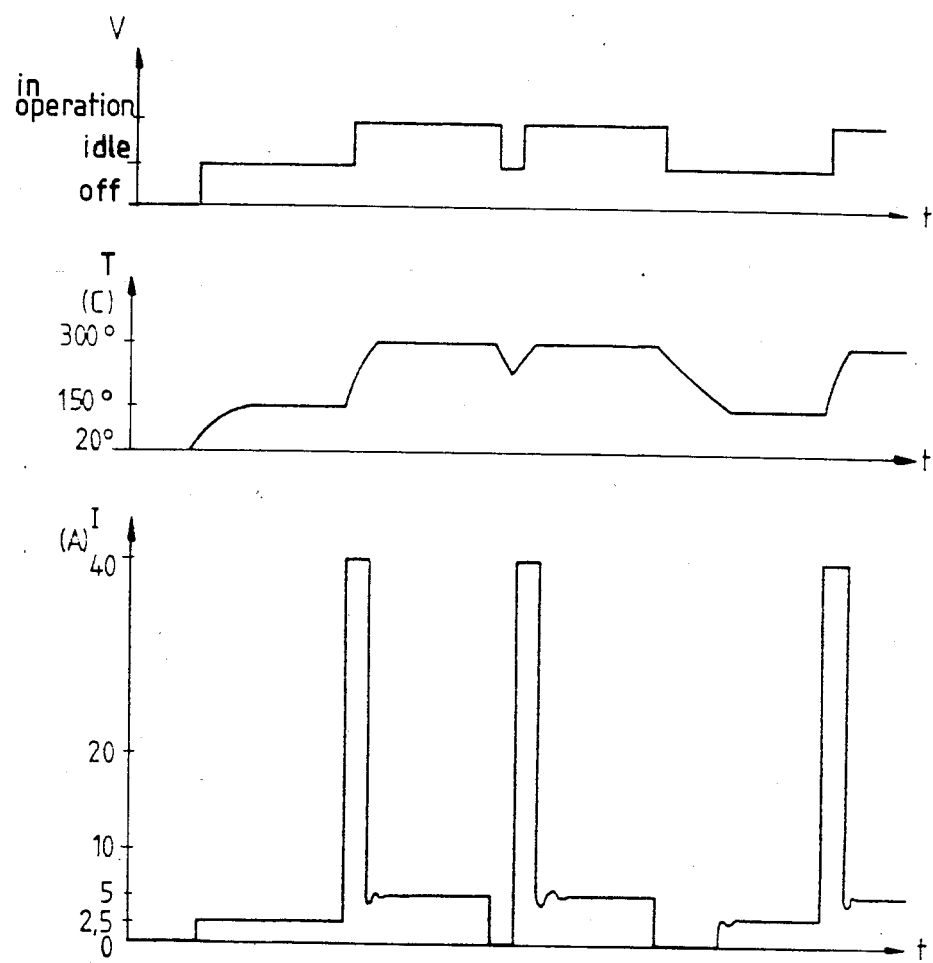
FIG. 1b diagrammatically shows further characteristic curves of operating behavior according to the invention.

Describing now the drawings, it is to be understood that to simplify the showing of the drawings only enough of the structure of the device has been illustrated therein as is needed to enable one skilled in the art to readily understand the underlying principles and concepts of this invention. The illustrated exemplary embodiment of the device will be seen to comprise an input circuit 210, a regulation circuit 220 and a control circuit 230. In the method of regulation according to the invention momentary value of at least one state of operating variable are tapped off or extracted from the apparatus to be regulated, for instance the voltage or the current or the power, and conducted to the regulation circuit 220. These momentary values of the state or operating variable are converted in the regulation circuit 220 and a preselected course of variation of every operating characteristic of the apparatus is simulated in a simulating device 223 by means of the state or operating variables. Feedback signals for the regulation of the apparatus are generated from this course of variation as well as from apparatus parameters.

In producing each feedback signal, the tapped and converted signal corresponding to the state or operating variable is combined with signals corresponding to specific device properties, the so-called apparatus parameters. It is combined, for instance, with signals corresponding to the particular type of apparatus 100 or with machine constants. The simulating device 223 simulates the behavior of the apparatus, i.e. the course or variation of the value of at least one of the operating characteristics of the apparatus in dependence of the state variables and of the apparatus parameters. For instance, in an electrothermal severing or shearing device one of these operating characteristics can be the temperature at the cutting wire. The particularly rapid rise of this cutting wire temperature when the apparatus is initially set in operation occurs between the idle temperature and the operating temperature.

The simulation can, for example, be performed with precisely the power applied to the apparatus as a state or operating variable or with a value exactly proportional thereto as a state or operating variable. Instead of the power, however, another parameter characteristic of the operation of the apparatus could also be employed as a state variable.

The regulation of the course or variation of the value of the operating characteristics can either be performed while taking into account the values of the system parameters; the alternation of the values then proceeds according to an operating characteristic which is adjusted according to these values of the system parameters; it is not dependent upon a possibly prescribed or prescribeable operating characteristic; or the course or variation of the value of the operating characteristic can occur in dependence of a prescribed reference operating characteristic i.e., a reference course of variation of such operating characteristic, wherein the practically arising actual operating characteristic is compared with the reference operating characteristic.

According to this comparison, respectively according to the deviation of the actual values from the reference operating characteristic, the values of the system parameters are readjusted or regulated such that the course or variation of the values of the operating characteristics proceeds according to the reference operating characteristic. In this manner it is possible to maintain approximately the same run-up time under any load and independent of the number of apparatuses.

The selection of a considerably higher heat-up operating temperature for regulation than the actual operating temperature is of basic importance for this method of regulation with, for instance, the temperature at the cutting wire as one of the operating characteristics. In this manner, a considerably steeper or very high slope branch or region of the characteristic curve, for instance a logarithmic function to the base e, i.e. a natural log function, which leads to the operative state of the apparatus, can be selected and thereby a correspondingly shorter time interval for the heating-up process to the actual operating temperature obtained.

Upon attaining the operating temperature, this temperature is maintained constant by the regulation device, i.e. the characteristic curve is essentially extended or continued at this point by a straight (horizontal) branch. This eliminates the asymptotic approach to the operating temperature which requires a great deal of time. The overshoot due to technical conditions generally remains in negligible orders of magnitude. Furthermore, for every re-regulation process, whether for maintaining the operating temperature constant or after an interruption of operation and partial cooling off of the electrothermal cutting device, regulation in this method of regulation begins at the final temperature corresponding to this cooling-off, but the heating-up current imposed upon the apparatus has a value corresponding to the state in which the characteristic curve runs through the base point, i.e. the idle temperature point, as will be understood from FIGS. 1a and 1b.

This method of regulation can be more precisely and more rapidly executed than other methods. This is especially true because the same unambiguously defined run-up curve is always employed.

The feedback signal is supplied to a comparison and regulation circuit which controls the apparatus and other circuits, for instance a control circuit.

The apparatus to be regulated can, as mentioned, be an electrothermal severing or cutting apparatus 100 for woven material. Such severing apparatuses or selvedge cutters are preferably mounted on the weaving machine at the edges of a fabric length. They sever the fabric edges or selvedges from the traveling fabric length. The thus newly created fabric edges are simultaneously bonded by the severing process, in particular they are welded or fused when the fabric contains synthetic fibers.

One or more electrothermal severing apparatuses 100 can be connected to a regulating device 200 for controlling and regulating the power supply and the stages of operation.

A roller shear with a bonding device, or similar apparatus, can be provided for producing a durable fabric edge instead of electrothermal severance or cutting-off.

The regulating device 200 operates according to the initially described method of regulation according to the invention and comprises the series circuit including the input circuit 210, the regulation circuit 220 and the control circuit 230.

The input circuit 210 comprises an adjustable potentiometer 211 for the idle state temperature and an adjustable potentiometer 212 for the operating state temperature, both of which are connected to a switch or switching means 213 for switching from one operating state to the other. A test push button 214 is also connected to the switch 213 to throw or commute it between the idle and the operating state positions when pressed and is also operated for checking or monitoring a suitable display lamp 218. A rectifier 216 is connected to an operating signal entry circuit 215 for an operating signal of a weaving machine or the like (since the processing device, i.e. the selvedge cutter or shear, is only to be operated when the machine is in operation). An isolating circuit 217 for the galvanic isolation of the regulating device 200 from mains or line voltage, e.g. by means of an opto-coupler, is connected to the rectifier 216 and also to the switch 213.

The output 213A of this switch 213 forms or defines the output of the input circuit 210 and is connected to a comparator circuit 221 on an input side 220A of the regulation circuit 220. The comparison circuit 221 is also connected to an output of a simulation device 223 of the regulation circuit 220 and carries out a comparison between the reference values and the actual values supplied by these two input signals. A PI regulator 222 connected to the comparator circuit 221 trims or adjusts the result of the comparison between the reference value and the actual value to zero in the regulating circuit branch. A phase-shift control circuit 224 is connected in series with this PI regulator or controller 222 and controls the phase-shift angle in dependence of the regulator output voltage. A transformer 225 whose secondary side is connected to the apparatus 100, for instance at least one electrothermal shear, is also connected to the phase-shift control circuit 224.

Instead of a PI regulator or controller, a P, PD or PID controller or regulator cam also be employed. It is also possible to arrange a state regulator or controller as a P circuit, that is a proportional circuit, in a feedback connection, that is in the connection an operating characteristic regulating circuit 223.2 and the comparator circuit 221. A state controller or regulator hierarchy can also be provided when regulating several state variables.

A current converter 226 for tapping off or detecting the regulated output variable, i.e. the current, is provided between the transformer 225 and the selvedge cutter or shear. This current is represented or simulated as a voltage value or potential drop across a resistance and is converted into direct current in a rectifier 227. The direct current is then squared in a square-law transfer circuit 228 in order to obtain an input variable corresponding to the power for the simulation circuit or device 223.

If the apparatus to be regulated represents a constant load to the regulation circuit, then the current is regulated as the output variable. It is, however, also possible, according to the individual case, to regulate the voltage. This is especially true when several apparatuses to be regulated are connected in parallel to one another.

The simulating circuit or device 223 comprises an input circuit 223.1 of input means 223.1, 223.2 for inputting a predetermined system parameters dependent upon the type of apparatus 100 to be regulated. This input can either be manual or automatic and governed by the construction of the apparatus. Furthermore, a circuit 223.2 of the input means 223.1, 223.2 for altering the amplification factor in conformity with the type of shear is provided in the simulation circuit or device 223 and is controlled by the input circuit 223.1. An operating characteristic circuit 223.3 is connected with the input circuit 223.1 and with the alteration circuit 223.2.

The operating characteristic circuit 223.3 determines the preselected operating characteristic curve branch for the temperature rise from the idle state temperature to the operating state temperature in dependence of the type of processing device or shear and in dependence of its regulation parameter correspondingly transformed or converted by the circuit 223.2 as well. The operating characteristic circuit 223.3 correspondingly transmits a continuous feedback signal as its output to the comparator circuit 221. In the present case, the temperature behavior is simulated in dependence of the time of the processing apparatus in this simulation circuit 223 and there is generated a corresponding feedback signal.

In one embodiment, besides taking into account the type of processing apparatus, parameters which are determined by the mounting on the processing machine, for instance the weaving machine, can be input into the simulation device 223. This can, for instance, be accomplished by a modified circuit 223.2.

The circuit 223.2 for altering the amplification factor or gain can also be connected at another point of the regulation device 200, for instance ahead of the switch 213.

The regulation circuit 220 is designed or dimensioned such that the same operating characteristic curve branch is always traversed in every heating-up regulation process. After an interruption of operation and a partial cooling off of the electrothermal cutting or shearing device, the regulation begins again at the final temperature corresponding to this degree of cooling off at the higher value of heating up current corresponding to the initial or base point of the operating characteristic curve, i.e. the idle state temperature, as can best be understood with reference to FIG. 1b.

The control circuit 230 is connected both to the output of the PI regulator or controller 222 and to the output of the rectifier 227. The PI controller or regulator 222 is connected to one input 232.3 of an AND gate 232 whose other input 232.1 is connected to an inverter 231. The inverter 231 is connected to the rectifier 227. The AND gate 232 controls via its output 232.3 an output relay 233 for controlling a machine, for instance a weaving machine.

The control circuit 230 transmits a termination-of-operation signal to the processing machine only when the apparatus 100 has been damaged. During current-free intervals generated by the regulation circuit, no termination-ofoperation-signal is generated.

In another embodiment of the regulation device according to the invention, an input circuit 310 for inputting the values for the idle state temperature, the operating state temperature, the type of apparatus to be regulated and the functions for calibrating and testing or for displaying these values or for both inputting and displaying these values is connected to a computer or control processor 320. The computer 320 is also connected to an entry circuit 350 for receiving or inputting an operating signal, for instance from a weaving machine at the start of the weaving operation. A control circuit 330 which supplies the apparatus to be regulated with power and which derives signals of one or more of the apparatus' state variables and processes them is also connected to the computer 320.

Figure 3:
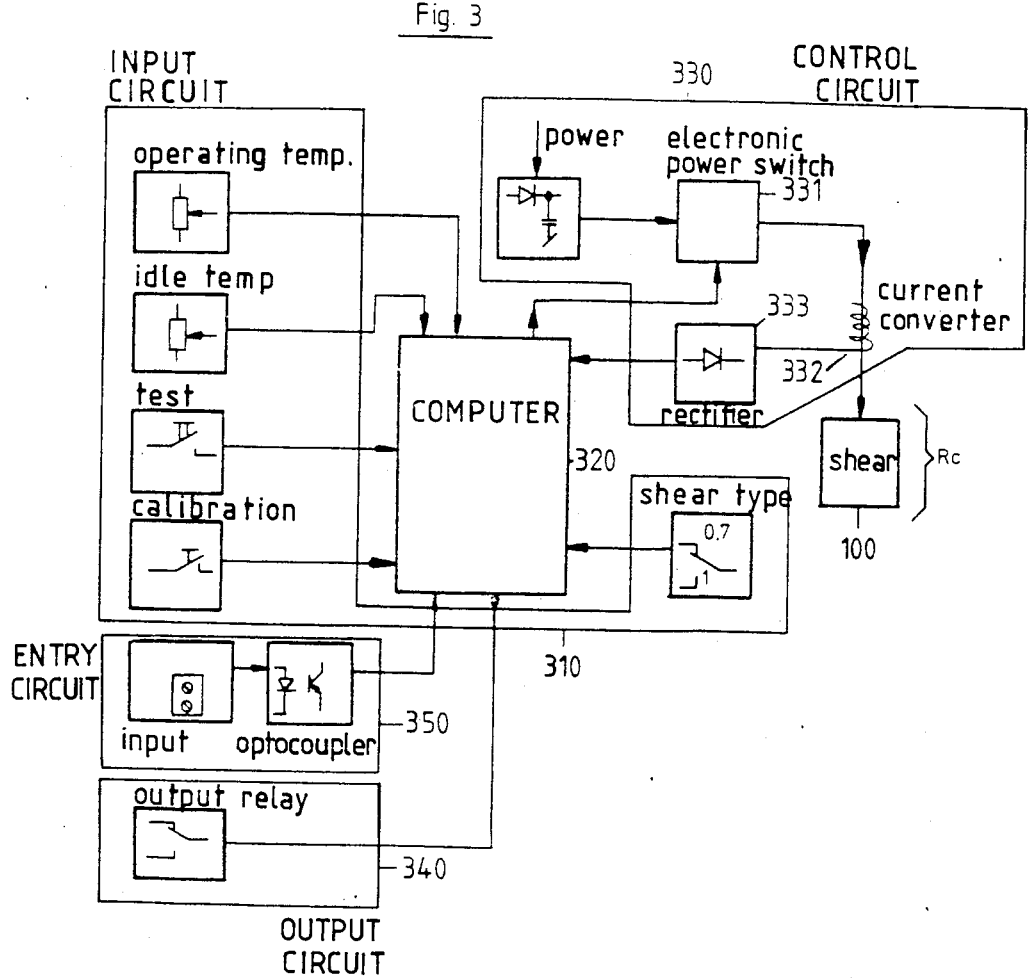
FIG. 3 is a schematic circuit diagram of a second embodiment of a regulating device according to the invention.

In addition to the means for tapping or detecting and processing the signals for at least one of the state variables, for instance the current converter 332 and the rectifier 333 and so forth the control circuit 330 also comprises an electronic power switch 331. The power switch 331 and the rectifier 333 are connected to the computer 320. Signals flow from the computer to the electronic power switch 331, respectively from the rectifier 333 to the computer 320. The current converter 332 is arranged ahead of the apparatus 100 to be regulated in the conductor or lead coming from the electronic power switch 331. The latter adjusts the width of the pulses for supplying energy to the apparatus on the basis of signals coming from the computer 320 in the manner of a pulse-width controller. Furthermore, an output circuit 340 is connected to the computer 320 and comprises means for transmitting control signals to a machine linked to or connected in series with the apparatus, for instance a weaving machine, as best will be seen in FIG. 3.

The apparatus 100 to be regulated can, in particular, be a heated wire shear device or a roller shear device having means for thermally bonding fabric edges.

While there are shown and described present preferred embodiments of the invention, it is to be distinctly understood that the invention is not limited thereto, but may be otherwise variously embodied and practiced within the scope of the following claim. Accordingly,

What we claim is:

1. A method of regulating an apparatus or group of apparatuses, comprising the steps of:
    tapping at least one state variable of the apparatus to be regulated from the apparatus to be regulated;
    conducting said at least one tapped state variable to a simulation circuit for simulating an operating characteristic of the apparatus according to a preselected course of variation of such operating characteristic and thereby generating simulated values of such operating characteristic and which simulated values are related to said at least one tapped state variable;
    conducting said simulated values of said operating characteristic to a comparison and regulation circuit and thereby regulating the apparatus to be regulated;
    selecting as said preselected course of variation a course of variation having a predetermined branch which leads to an operative state of the apparatus to be regulated; and
    selecting as said predetermined branch a branch of a logarithmic function to the base e and which branch has a very high slope.

2. A regulating device for regulating an apparatus or group of apparatuses, comprising:
    an input circuit;
    a regulation circuit connected to said input circuit;
    said apparatus regulated by the regulating device being operatively associated with a machine;
    a control circuit connected to said regulation circuit and controlling the operation of said machine;
    said regulation circuit containing on its input side a comparator circuit which is connected to an output of said input circuit;
    said comparator circuit comparing reference values received from said input circuit and simulated values of an operating characteristic related in a predetermined relationship to momentary values of at least one state variable of said apparatus regulated by the regulating device;
    said regulation circuit further containing:
    a PI regulator series connected with said comparator circuit;
    a phase-shift control circuit series connected with said PI regulator;
    a transformer series connected with said phase-shift control circuit and operatively connected with said apparatus regulated by the regulating device;
    a current converter for measuring current and interconnecting said transformer and said apparatus regulated by the regulating device;
    said current converter being mounted at said apparatus regulated by the regulating device;
    a rectifier series connected with said current converter;
    a square-law transfer circuit series connected with said rectifier;
    a simulation circuit series connected with said square-law transfer circuit;
    said operating characteristic of said apparatus being variable according to a preselectable course of variation;
    said simulation circuit taking into account said preselected course of variation of said operating characteristic; and
    said comparator circuit on said input side of said regulation circuit being connected in series with said simulation circuit.

3. The regulating device as defined in claim 2, wherein:
    said simulation circuit in said regulation circuit contains input means for inputting at least one system parameter related to said apparatus regulated by the regulating device;
    said simulation circuit further containing an operating characteristic circuit series connected with said input means;
    said operating characteristic circuit, in response to signals infed by said input means and constituting momentary values related to at least one state variable of the apparatus regulated by the regulating device, generating simulated values of said operating characteristic according to said preselected course of variation of said operating characteristic of said apparatus regulated by the regulating device; and
    said simulation circuit feeding to said comparator circuit said simulated values related to said predetermined operating characteristic and said at least one system parameter of said apparatus regulated by the regulating device.

4. The regulating device as defined in claim 3, wherein:

said preselected course of variation of said operating characteristic constitutes a time constant.

5. A regulating device for regulating an apparatus or group of apparatuses, comprising:
an input circuit;
a regulation circuit connected to said input circuit;
said apparatus regulated by the regulating device being operatively associated with a machine;
a control circuit connected to said regulation circuit and controlling the operation of said machine;
said regulation circuit contains a rectifier and a PI regulator;
said control circuit containing an inverter series connected with said rectifier in said regulation circuit;
said control circuit further containing an AND gate having two inputs and an output;
one of said two inputs of said AND gate being connected to said inverter;
a further one of said two inputs of the AND gate being series connected to said PI regulator;

6. A regulation device for regulating an apparatus or group of apparatuses, comprising:
a computer;
an input circuit operatively connected to said computer;
the apparatus regulated by the regulating device being associated with a machine;
an entry circuit connected to said computer and generating an operating signal for said machine with which said apparatus is associated;
a control circuit interconnecting the apparatus regulated by the regulating device and said computer;
said control circuit supplying and metering power to said apparatus;
said control circuit receiving and processing momentary values of at least one state variable of said apparatus and inputting processed values related to such momentary values into the computer;
an output circuit connected to said computer and controlling the operation of said machine;
said control circuit containing an electronic power switch connected to said computer;
said control circuit further containing pulse-width control means controlling the power fed to said apparatus regulated by the regulating device; and
said electronic power switch of said control circuit being adjusted by said computer for maximum pulse width.

7. An apparatus regulated by a regulating device containing an input circuit which includes at least one adjusting element for adjustment of at least one reference value related to an operating characteristic of the apparatus and a regulation circuit including simulation means receiving momentary values of at least one state variable from said apparatus and generating therefrom simulated values according to a preselected course of variation of said operating characteristic for comparison with said at least one reference value in said regulation circuit; and comprising:
an apparatus for severing selvedges of fabric lengths and constituting said apparatus regulated by the regulating device.

8. The apparatus as defined in claim 7, wherein:
said apparatus comprises a thermal wire shear device.

9. The apparatus as defined in claim 7, wherein:
said apparatus comprises a mechanical shear device having means for bonding severed edges of fabric lengths.

10. The apparatus as defined in claim 9, wherein:
said mechanical shear device comprises a roller shear.

11. A regulating device for regulating an apparatus or group of apparatuses, comprising:
an input circuit;
a regulation circuit connected to said input circuit;
said apparatus regulated by the regulating device being operatively associated with a machine;
a control circuit connected to said regulation circuit and controlling the operation of said machine;
the apparatus regulated by the regulating device being capable of assuming a predetermined number of operating states;
said input circuit containing a predetermined number of adjusting elements for adjusting related reference values each of which is associated with one of said predetermined number of operating states of said apparatus regulated by the regulating device;
said input circuit further containing switching means switchable between a predetermined number of switching states each of which is associated with a related one of said reference values associated with said predetermined number of operating states of said apparatus regulated by the regulating device;
said predetermined number of adjusting elements being connected to said switching means for switching said switching means between said predetermined number of switching states;
said input circuit further containing a manually operable test push button switch;
said input circuit further containing a galvanically isolated entry circuit operatively associated with said machine with which said apparatus is operatively associated;
said switching means being connected with said manually operable test push button switch and said galvanically isolated entry circuit; and
said switching means containing an output connected with said regulation circuit on an input side thereof.

12. The regulating device as defined in claim 11, wherein:
said apparatus regulated by the regulating device constitutes a heating apparatus;
said predetermined number of operating states of said heating apparatus constitute two temperature states of said heating apparatus;
said two temperature states of said heating apparatus constituting an idle temperature state and an operative temperature state of said heating apparatus; and
said predetermined number of adjusting elements constituting two adjusting elements for adjusting reference values respectively related to said idle temperature state and said operative temperature state of said heating apparatus.

* * * * *

UNITED STATES PATENT OFFICE
CERTIFICATE OF CORRECTION

PATENT NO. : 4,700,289
DATED : October 13, 1987
INVENTOR(S) : BEAT DE COI et al

It is certified that error appears in the above-identified patent and that said Letters Patent are hereby corrected as shown below:

Column 5, line 54, after "connection" please insert --between--

Column 6, line 56, after "input" please delete "232.3" and insert --232.2--

Column 6, line 62 and 63, after "a" please delete "termination-ofoperation" and insert --termination-of-operation--

Column 6, line 65 and 66, after "no" please delete "termination-ofoperation" and insert --termination-of-operation--

Column 9, line 21, after "PI regulator" please insert

--said control circuit containing an output relay connected to said output of said AND gate;
said AND gate controlling said output relay; and
said output relay controlling said machine with which said apparatus is associated.--

Signed and Sealed this

Twelfth Day of April, 1988

*Attest:*

DONALD J. QUIGG

*Attesting Officer*   *Commissioner of Patents and Trademarks*